United States Patent Office.

CHARLES S. WELLS, OF SPRINGFIELD, MASSACHUSETTS.

Letters Patent No. 108,542, dated October 18, 1870.

IMPROVEMENT IN THE MANUFACTURE OF BOXES, CARTRIDGE-CASES, &c.

The Schedule referred to in these Letters Patent and making part of the same.

*To all whom it may concern:*

Be it known that I, CHARLES S. WELLS, of Springfield, in the county of Hampden and State of Massachusetts, have invented a new and useful Material for the Manufacture of Boxes, Cartridge-Cases, and other articles; and I do hereby declare that the following is a full, clear, and exact description thereof.

My invention relates to the manufacture of molded or pressed boxes, cartridge-cases, and other receptacles by the use of a pulp, or composition which will not shrink or swell or otherwise materially change its form after being molded or pressed.

To enable others skilled in the art to make and use my invention, I will proceed to describe the same.

I use as a basis any kind of pulp, whether manufactured from wood, waste rags, or any other substance, and in a moistened or plastic state, so that it may readily take the form of the mold or die, and in connection with it I use the following substances to give it body, toughness, and elasticity, and I find the following proportions produce a very good and practical result:

One pound of dextrine, one-eighth of a pound of tragacanth, one-fourth pound of glycerine, and about ten pounds of pulp.

This makes a composition which produces, in a mold or die, a box, cartridge-case, or other similar article, which will always retain materially the same form as when taken from the die or mold, with no very perceptible variation by shrinkage from drying, and at the same time the box, cartridge-case, or other article is very elastic, as the gums used render the article very hard upon the surface when dry, and the glycerine gives the mass within a certain degree of moisture, which renders it elastic to a greater or lesser degree.

This hardness and elasticity combined is very desirable in the manufacture of certain articles, and is particularly desirable in the manufacture of cartridge-cases, as the force of the explosion tends to expand the cartridge-case within the gun to fill the chamber, while it is sufficiently hard to retain its form under all ordinary circumstances, and in the packing and transportation of boxes these qualities cause them to retain their form, and yet prevents them from being easily broken.

These proportions may be varied in the manufacture of articles according as it is desired to have the different qualities of elasticity or hardness predominate, and also according to the different kinds of pulp used, as pulp manufactured from wood or vegetable matter may require less dextrine than when made from the ordinary paper stock; but when no glycerine is used the article manufactured becomes hard and dry throughout, and when it is added in more or less quantities the article manufactured retains a corresponding condition of internal moisture and elasticity.

In the manufacture of some articles, such as boxes, &c., it may be desirable to paste plain or ornamental paper either inside or outside, or both, to improve the appearance, and in the manufacture of cartridge-cases it may be desirable to put paper or other material upon the outside or inside, or both, to operate as a reinforcement, and in either case none of the elasticity or other desirable quality of the article will be injured or destroyed.

In the manufacture of either of the above-named articles the composition is used in a plastic state, and any desirable form may be given to it by means of a mold or die of the required exterior form of the article, and an inside counter-die or punch of the required inside form of the article, with sufficient space between to press in an amount of pulp necessary to give it the desired strength and body.

It will be seen that in the manufacture of different articles the pulp may be tempered with the gums and glycerine according to the desired degree of hardness or elasticity, or both, in the manufactured article.

Having thus described my invention,

What I claim as new, and desire to secure by Letters Patent, is—

1. The composition or tempered pulp, substantially as herein described and set forth.

2. The manufacture of boxes, cartridge-cases, and other articles, when molded or pressed up in the manner substantially as herein described.

3. The above, when molded or pressed up, and having paper or other material attached either inside or outside, or both, substantially as and for the purposes herein described.

CHARLES S. WELLS.

Witnesses:
T. A. CURTIS,
J. WEST WAGNER.